(12) United States Patent
Augustin et al.

(10) Patent No.: US 12,364,915 B2
(45) Date of Patent: *Jul. 22, 2025

(54) FREE-STANDING A-FRAME EXERCISE EQUIPMENT CABINET

(71) Applicant: TEMPO INTERACTIVE INC., San Francisco, CA (US)

(72) Inventors: Joshua Augustin, San Francisco, CA (US); Moawia Eldeeb, Brisbane, CA (US)

(73) Assignee: Tempo Interactive Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,816

(22) Filed: Jan. 26, 2023

(65) Prior Publication Data

US 2023/0166174 A1 Jun. 1, 2023

Related U.S. Application Data

(63) Continuation of application No. PCT/US2021/043344, filed on Jul. 27, 2021, which is
(Continued)

(51) Int. Cl.
*A63B 71/00* (2006.01)
*A63B 21/00* (2006.01)
(Continued)

(52) U.S. Cl.
CPC ...... *A63B 71/0036* (2013.01); *A63B 21/4037* (2015.10); *A63B 24/0006* (2013.01);
(Continued)

(58) Field of Classification Search
CPC ............ A63B 71/0036; A63B 21/4037; A63B 24/0006; A63B 24/0062; A63B 24/0075;
(Continued)

(56) References Cited

U.S. PATENT DOCUMENTS 4,811,946 A * 3/1989 Pelczar .............. A63B 21/4035
482/901
8,029,410 B2 10/2011 Shea
(Continued)

FOREIGN PATENT DOCUMENTS

KR 20220102674 A * 7/2022

OTHER PUBLICATIONS

International Preliminary Report of Patentability and International Search Report for corresponding International Application No. PCT/US2021/043344, mailed Jan. 31, 2023, 4 Pages.
(Continued)

*Primary Examiner* — Sundhara M Ganesan
(74) *Attorney, Agent, or Firm* — Ahmann Kloke LLP

(57) ABSTRACT

A free-standing A-frame exercise equipment cabinet comprising a first portion of the free-standing A-frame exercise equipment cabinet configured to removably house first exercise weight plates of a plurality of different sizes and a plurality of different weights. A second portion of the cabinet is configured to house a computer screen display. A third portion of the cabinet is configured to house at least one camera, one or more processors, and memory storing instructions that, when executed by the one or more processors, cause the cabinet to present a display on the computer screen display housed in the second portion of the cabinet. A fourth portion of the cabinet is configured to removably house at least one barbell and a plurality of dumbbells. A fifth portion of the cabinet comprises four legs of the cabinet that allow the cabinet to stand upright without additional support.

19 Claims, 8 Drawing Sheets

Related U.S. Application Data a continuation of application No. 17/321,372, filed on May 14, 2021, now Pat. No. 11,202,951.

(60) Provisional application No. 63/057,155, filed on Jul. 27, 2020.

(51) Int. Cl.
| | |
|---|---|
| *A63B 24/00* | (2006.01) |
| *A63B 71/04* | (2006.01) |
| *A63B 71/06* | (2006.01) |
| *G06F 3/01* | (2006.01) |
| *G06F 3/04815* | (2022.01) |
| *G06N 3/08* | (2023.01) |
| *G09B 19/00* | (2006.01) |
| *A63B 21/072* | (2006.01) |
| *G06V 40/20* | (2022.01) |

(52) U.S. Cl.
CPC ...... *A63B 24/0062* (2013.01); *A63B 24/0075* (2013.01); *A63B 71/04* (2013.01); *A63B 71/0622* (2013.01); *G06F 3/011* (2013.01); *G06F 3/04815* (2013.01); *G06N 3/08* (2013.01); *G09B 19/0038* (2013.01); *A63B 21/072* (2013.01); *A63B 2024/0015* (2013.01); *A63B 2024/0068* (2013.01); *A63B 2024/0081* (2013.01); *A63B 2071/0625* (2013.01); *A63B 2071/0638* (2013.01); *A63B 2071/0647* (2013.01); *A63B 2210/06* (2013.01); *A63B 2220/05* (2013.01); *A63B 2220/803* (2013.01); *A63B 2220/805* (2013.01); *A63B 2220/806* (2013.01); *A63B 2220/833* (2013.01); *G06T 2207/30196* (2013.01); *G06T 2207/30221* (2013.01); *G06V 40/23* (2022.01)

(58) Field of Classification Search
CPC ... A63B 71/04; A63B 71/0622; A63B 21/072; A63B 2024/0015; A63B 2024/0068; A63B 2024/0081; A63B 2071/0625; A63B 2071/0638; A63B 2071/0647; A63B 2220/05; A63B 2220/803; A63B 2220/805; A63B 2220/806; A63B 2220/833; A63B 2225/20; A63B 2225/50; A63B 21/0724; A63B 21/0726; A63B 2210/06; G06F 3/011; G06F 3/04815; G06N 3/08; G09B 19/0038; G06T 2207/30196; G06T 2207/30221; G06V 40/23

See application file for complete search history.

(56) References Cited

U.S. PATENT DOCUMENTS

| | | |
|---|---|---|
| 8,109,862 B2 | 2/2012 | Cooper |
| 2008/0179214 A1 | 7/2008 | Hall |
| 2010/0197399 A1 | 8/2010 | Geiss |
| 2010/0317488 A1 | 12/2010 | Cartaya |
| 2013/0123667 A1 | 5/2013 | Komatireddy et al. |
| 2014/0134584 A1 | 5/2014 | French |
| 2015/0196804 A1 | 7/2015 | Koduri et al. |
| 2015/0359462 A1 | 12/2015 | Laan et al. |
| 2016/0096062 A1 | 4/2016 | Moerth-Cross |
| 2016/0199693 A1 | 7/2016 | Vermilyea et al. |
| 2016/0332054 A1 | 11/2016 | Smith |
| 2017/0007884 A1 | 1/2017 | Deutsch et al. |
| 2017/0148345 A1 | 5/2017 | Dickerson |
| 2017/0243511 A1 | 8/2017 | Belsito |
| 2017/0266491 A1 | 9/2017 | Rissanen et al. |
| 2017/0304705 A1 | 10/2017 | Hermandorfer |
| 2017/0326411 A1 | 11/2017 | Watterson |
| 2018/0020954 A1 | 1/2018 | Lillie et al. |
| 2018/0130373 A1 | 5/2018 | Bernard-Paroly et al. |
| 2018/0184947 A1 | 7/2018 | Richards et al. |
| 2019/0091515 A1 | 3/2019 | Shavit et al. |
| 2019/0126122 A1* | 5/2019 | Vester ............... A63B 71/0036 |
| 2019/0209777 A1 | 7/2019 | O'Connell et al. |
| 2019/0295436 A1 | 9/2019 | Rubinstein et al. |
| 2020/0009444 A1 | 1/2020 | Putnam |
| 2020/0114190 A1 | 4/2020 | Tuller |
| 2020/0114204 A1 | 4/2020 | Owusu |
| 2020/0126284 A1 | 4/2020 | Garofalo et al. |
| 2020/0175266 A1 | 6/2020 | Murakami |
| 2020/0254309 A1 | 8/2020 | Watterson |
| 2020/0302621 A1 | 9/2020 | Kong et al. |
| 2020/0333462 A1 | 10/2020 | Mellor et al. |
| 2020/0388187 A1 | 12/2020 | Nakashima et al. |
| 2021/0004981 A1 | 1/2021 | Song |
| 2021/0019507 A1 | 1/2021 | Brookshire et al. |
| 2021/0138332 A1 | 5/2021 | Dalebout et al. |
| 2021/0154529 A1 | 5/2021 | Barr |

OTHER PUBLICATIONS

International Search Report and Written Opinion for International Application No. PCT/US2021/043344, mailed Nov. 19, 2021 (9 Pages).

* cited by examiner

FREE-STANDING A-FRAME EXERCISE EQUIPMENT CABINET

CROSS-REFERENCE TO RELATED APPLICATIONS

This present application is a continuation of International Application No. PCT/US2021/043344 filed on Jul. 27, 2021, and entitled "FREE-STANDING A-FRAME EXERCISE EQUIPMENT CABINET", which claims priority to U.S. Non-Provisional patent application Ser. No. 17/321,372 filed May 14, 2021, and entitled "FREE-STANDING A-FRAME EXERCISE EQUIPMENT CABINET", which claims priority to U.S. Provisional Patent Application Ser. No. 63/057,155 filed Jul. 27, 2020, and entitled "AN EXERCISE PLATFORM," which are hereby incorporated by reference herein.

DETAILED DESCRIPTION

Figure 1B:
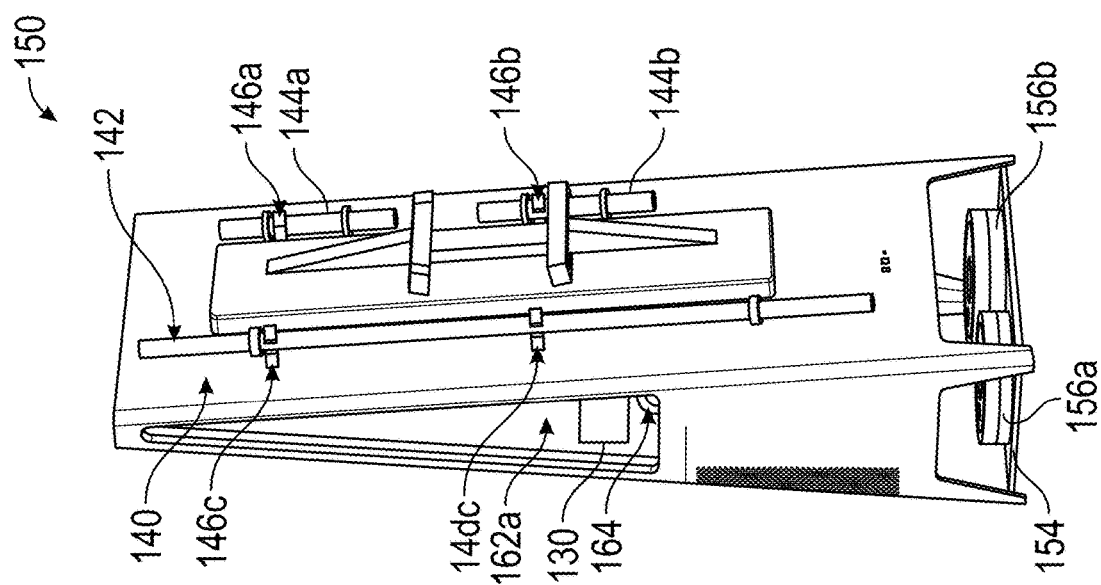
FIG. 1B depicts an example of a free-standing A-frame exercise equipment cabinet with an additional workbench.
Figure 1A:
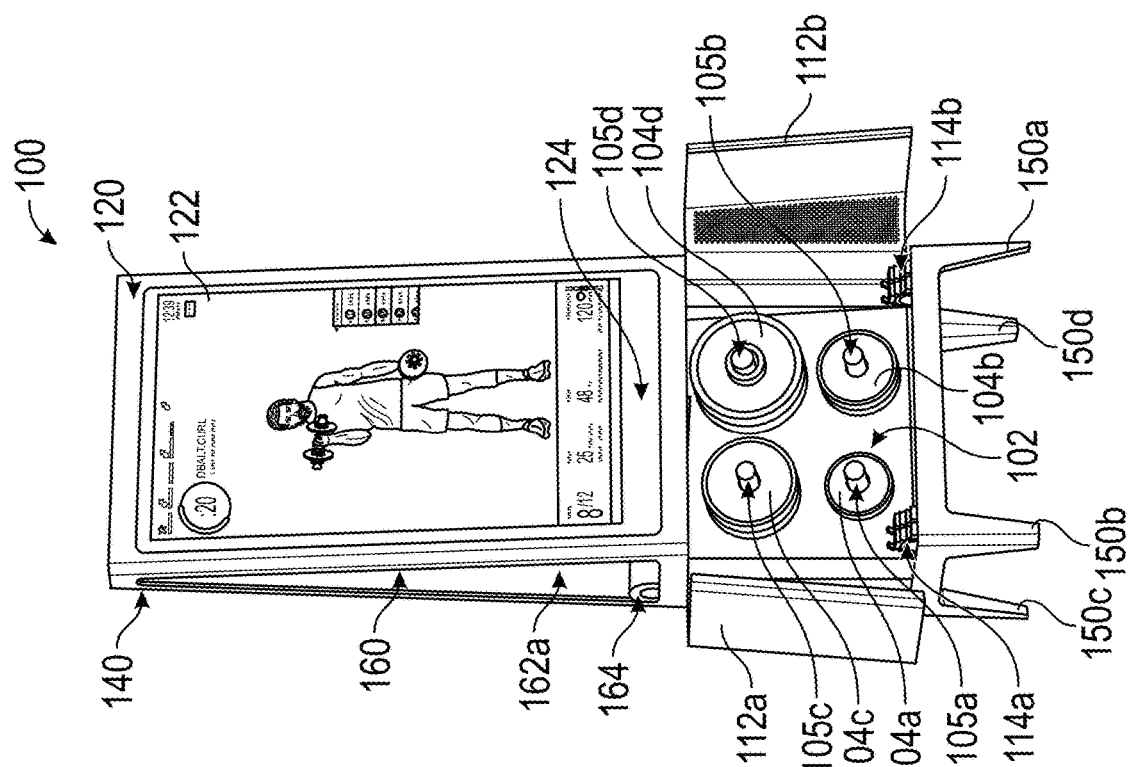
FIG. 1A depicts an example of a free-standing A-frame exercise equipment cabinet.

FIGS. 1A-1B depict examples of a free-standing A-frame exercise equipment cabinet 100. Generally, the free-standing A-frame exercise equipment cabinet 100 provides an "all-in-one" fitness platform (e.g., for home-use). In some embodiments, the free-standing exercise-equipment cabinet 100 has an integrated computer screen display (e.g., LCD or OLED) that can serve as both a display and as a touch screen user interface for an interactive exercise system. The free-standing A-frame exercise equipment cabinet 100 can also include storage containers for exercise equipment. Additionally, the free-standing A-frame exercise equipment cabinet 100 can locally house computer software and hardware, such as one or more three-dimensional (3D) camera (e.g., for use in computer vision applications) and an integrated computer.

In one example, the free-standing A-frame exercise equipment cabinet 100 stands six feet in height (or approximately six feet, e.g., within 6 inches of six feet), and two feet wide (or approximately two feet, e.g., within 6 inches of two feet). It will be appreciated that the free-standing A-frame exercise equipment cabinet 100 stands on its own and does not require a dedicated or full-time installation to be fully functional. In other words, the free-standing A-frame exercise equipment cabinet 100 can be easily positioned and moved (e.g., by one person) and placed in different locations without requiring an installation, de-installation, or other additional supports.

In the example of FIG. 1A, the free-standing A-frame exercise equipment cabinet 100 includes a first portion (or, "weight cabinet") 102 of the free-standing A-frame exercise equipment cabinet 100, a second portion (or, "display portion") 120 of the free-standing A-frame exercise equipment cabinet 100, a third portion 130 (or "computing component" portion) of the free-standing A-frame exercise equipment cabinet 100, a fourth portion 140 (or "rear" portion, as more clearly depicted in FIG. 1B) of the free-standing A-frame exercise equipment cabinet 100, a fifth portion 150 (or, "legs" or "stand" portion) of the free-standing A-frame exercise equipment cabinet 100, and a sixth portion 160 (or, "open-air interior" portion) of the free-standing A-frame exercise equipment cabinet 100. Although the first portion, second portion, third portion, fourth portion, fifth portion, and sixth portion of the free-standing A-frame exercise equipment cabinet 100 are shown in a specific configuration in the embodiment of FIG. 1A, other embodiments may contemplate different configurations. It will be appreciated that in some embodiments the entire free-standing A-frame exercise equipment cabinet 100 may be constructed from a single piece or sheet of material (e.g., metal), or one or more portions of the free-standing A-frame exercise equipment cabinet 100 may be constructed from one or more pieces of material and connected together to form the free-standing A-frame exercise equipment cabinet 100.

In a specific implementation, the first portion 102 of the free-standing A-frame exercise equipment cabinet 100 is configured to removably house exercise weight plates 104a-d. In the example of FIG. 1, the first portion 102 of the free-standing A-frame exercise equipment cabinet 100 includes mounts (or, pegs) 105a-d that can hold weight plates of varying sizes (e.g., diameter and width) and weights (e.g., pounds or kilograms). For example, each mount 104 may be capable of receiving dumbbell weight plates 104a-b and barbell weight plates 104c-d of varying sizes and weights.

In some embodiments, the exercise weight plates 104 are sized to allow each of the weight plates 104 to fit onto the outer diameter of both a barbell and a dumbbell. The weight plates 104 may each have fixed amounts of pounds or kilograms, and each can have a distinct color and geometry. However, each weight plate 104 may have a center hole with a diameter that can fit on both a dumbbell and a barbell. In some embodiments, the weight plates 104 may be color coded, or include other identifiers (e.g., tags), to facilitate recognition by a machine vision system.

In a specific implementation, the first portion of the free-standing A-frame exercise equipment cabinet 100 is accessed (e.g., by a user) by placing one or both of the doors 112a-b in an open position (e.g., as shown in FIG. 1A) using door hinges 114a-b. The doors 112a-b may be ventilated to provide airflow when the doors 112 are in a closed position. For example, each door panel 112 may include perforations over some or all of the surface area of the door panels 112. The perforations may also reduce an overall weight the free-standing A-frame exercise equipment cabinet 100. Advantageously, the weights and mounts 105a-d are entirely contained behind the doors 112a-b, making the freestanding A-frame exercise equipment cabinet 100 aesthetically unobtrusive and safe by making it less likely for the mounts to snag clothing or cause injury when a person bumps into them.

In a specific implementation, the second portion 120 of the free-standing A-frame exercise equipment cabinet 100 is configured to mount a computer screen display 122. The computer screen display 122 may be a 42" LCD capable of presenting graphical information and images to a user while a user is exercising. In a specific implementation, the computer screen display 122 includes a mirror display that allows a user to see their form while exercising. Instead or in addition, the computer screen display 122 can include display of proper movement form as demonstrated by a trainer for viewing by a user.

In a specific implementation, the computer screen display 122 includes a touch screen display. The touch screen display can incorporate a user interface that is easy and intuitive to navigate. Such a user interface can allow the user to select, for example, HIIT and Tabata classes, warm-up and cool-down sessions, mobility routines, body-part specific workouts, or the like. Instead or in addition, the computer screen display 122 can display data provided by a handheld or wearable device of a user and/or the user interface can be navigated using data provided by the handheld or a wearable device.

In some embodiments, the second portion 120 of the free-standing A-frame exercise equipment cabinet 100 includes a glass covering over the front of the computer screen display 122, and one or more panels (e.g., a metal panel(s)) covering the rear, sides, bottom, and/or top portions of the computer screen display 122. The glass covering can serve as a protective covering and, if desired, improve the aesthetics of the A-frame exercise equipment cabinet 100.

In a specific implementation, the second portion 120 of the free-standing A-frame exercise equipment cabinet 100 comprises a top front portion of the free-standing A-frame exercise equipment cabinet 100, and the first portion 102 of the free-standing A-frame exercise equipment cabinet 100 is directly below the second portion 120 of the free-standing A-frame exercise equipment cabinet 100 (e.g., as shown in FIG. 1A). Advantageously, the A-frame itself provides stability, plus the weights housed in the first portion 102 act as an anchor to provide further stability, for the computer screen display 122.

In a specific implementation, the third portion 130 of the free-standing A-frame exercise equipment cabinet 100 is configured to mount at least one camera. The camera may be 3D camera, a Kinect camera, and/or the like, and it may be positioned behind a camera hole 124. The camera, or cameras, may be of the type to support computer vision capabilities. The third portion 130 of the free-standing A-frame exercise equipment cabinet 100 may also be configured to house other electronics and/or an integrated computer system (e.g., memory, processors, graphical processing units, computer vision software and/or hardware, network hardware and software to provide Wi-Fi and Bluetooth network connections, stereo speakers, 3D motion tracking system, sensors, and/or the other computer hardware and software). The integrated computer system may be referred to simply as the "computer system" or "cabinet computer system". The computer system may be integrated into the free-standing A-frame exercise equipment cabinet 100. The cabinet computer system is discussed further below.

In a specific implementation, the third portion 130 of the free-standing A-frame exercise equipment cabinet 100 is positioned behind the first portion 102 of the free-standing A-frame exercise equipment cabinet 100. For example, the third portion 130 may be located between the first portion 120 of the free-standing A-frame exercise equipment cabinet 100 and the fourth portion 140 of free-standing A-frame exercise equipment cabinet 100 (discussed below). For example, the third portion 130 of the free-standing A-frame exercise equipment cabinet 100 may be located on rear surface of the first portion 102 of the free-standing A-frame exercise equipment cabinet 100.

In a specific implementation, the fourth portion 140 of the free-standing A-frame exercise equipment cabinet 100 is configured to removably house at least one barbell and a plurality of dumbbells, and/or other exercise equipment (e.g., bench, weight plates, mats, and/or the like). The fourth portion 140 of the free-standing A-frame exercise equipment cabinet 100 is discussed further with reference to FIG. 1B.

In a specific implementation, the fifth portion 150 of the free-standing A-frame exercise equipment cabinet 100 includes four legs 150a-d of the free-standing A-frame exercise equipment cabinet 100. The four legs 150a-d of the free-standing A-frame exercise equipment cabinet 100 can allow the free-standing A-frame exercise equipment cabinet 100 to stand upright without additional support. Although four legs are shown here, other embodiments may have a greater lesser number of such legs, or use other supports (e.g., a flat surface). In some embodiments, each leg 150a-b have a small rubber nub on the bottom. These nubs can help stabilize the free-standing A-frame exercise equipment cabinet 100 and/or allow it to slide smoothly across a floor, or other surface, leaving hardwood floors scratch-free.

In a specific implementation, the sixth portion 160 of the free-standing A-frame exercise equipment cabinet 100 is configured to removably store additional exercise equipment. The additional exercise equipment can include, for example, a rolled-up yoga mat 164. The specific implementation, the sixth portion 160 of the free-standing A-frame exercise equipment cabinet 100 comprises an interior upper middle portion of the free-standing A-frame exercise equipment cabinet 100, and the interior upper middle portion of the free-standing A-frame exercise equipment cabinet 100 is positioned between the second portion 120 of the free-standing A-frame exercise equipment cabinet 100 and the fourth portion 140 of the free-standing A-frame exercise equipment cabinet 100. The sixth portion 160 of the free-standing A-frame exercise equipment cabinet 100 can include two opposing openings (e.g., opening 162a shown in FIG. 1A and opening 162b shown in FIG. 1B) of the free-standing A-frame exercise equipment cabinet 100, and each of the two opposing openings can provide access to an interior of the sixth portion 160 of the free-standing A-frame exercise equipment cabinet 100. The two opposing openings 162 of the free-standing A-frame exercise equipment cabinet 100 can each comprise an open-air opening.

FIG. 1B depicts an example of a free-standing A-frame exercise equipment cabinet 100 with an additional workbench 154. In some embodiments, the free-standing A-frame exercise equipment cabinet 100 shown in FIG. 1B may include some or all of features of the free-standing A-frame exercise equipment cabinet 100 shown in FIG. 1A. In other words, the only difference between the free-standing A-frame exercise equipment cabinet 100 shown in FIG. 1A and the free-standing A-frame exercise equipment cabinet 100 shown in FIG. 1B may be the addition of the workbench 154, and the additional weights 156a-b positioned on the workbench 154. Thus, for example, the free-standing A-frame exercise equipment cabinet 100 of FIG. 1B may include the features shown in free-standing A-frame exercise equipment cabinet 100 of FIG. 1A, and vice versa.

As shown, the fourth portion 140 of the free-standing A-frame exercise equipment cabinet 100 comprises a rear portion of the free-standing A-frame exercise equipment cabinet 100. The fourth portion 140 of the free-standing A-frame exercise equipment cabinet 100 includes mounts 146a-d which are configured to hold the barbell 142 and dumbbells 144a-b. For example, the mounts 146 may comprise hooks and the barbell 142 and the dumbbells 144 can hang on the hooks. Other embodiments may include a greater or lesser number of such mounts 146a-b and/or dumbbells 144 and barbells 142.

In some embodiments, the free-standing A-frame exercise equipment cabinet 100 may be customizable (e.g., by the manufacturer and/or a user). For example, the first portion 102 of the free-standing A-frame exercise equipment cabinet 100 may be customized to hold a different number of weights and different types of weights, the second portion 120 of the free-standing A-frame exercise equipment cabinet 120 may be customized to house a computer screen display of a different size, the fourth portion 140 of the free-standing A-frame exercise equipment cabinet 100 may be customized to hold different types and/or different number of weight equipment, the work bench 154 of the free-standing A-frame exercise equipment cabinet 100 may be able to be added or removed (e.g., during manufacturing or after manufacturing by a user), and/or the like. Accordingly, the free-standing A-frame exercise equipment cabinet 100 may comprise a modular design. For example, each of the portions, and/or the components of portions (e.g., the mounts 104 of the first portion 102 of the free-standing A-frame exercise equipment cabinet 100) may be a connectable module that may be adjusted or otherwise customized (e.g., during manufacturing or by a user after manufacturing.) Continuing the prior example, the free-standing A-frame exercise equipment cabinet 100 may include additional receiving points (e.g., holes) for additional mounts (e.g., pegs) in the first portion 102 of the free-standing A-frame exercise equipment cabinet 100 and/or the fourth portion 140 of the free-standing A-frame exercise equipment cabinet 100.

FIGS. 2A-2F are schematic diagrams depicting orthographic views 200, 210, 220, 230, 240 and 250 of an example of a free-standing A-frame exercise equipment cabinet. In the example of FIGS. 2A-2F, the freestanding A-frame exercise equipment cabinet is represented for illustrative purposes as the freestanding A-frame exercise equipment cabinet 100 of FIG. 1.

Figure 2A:
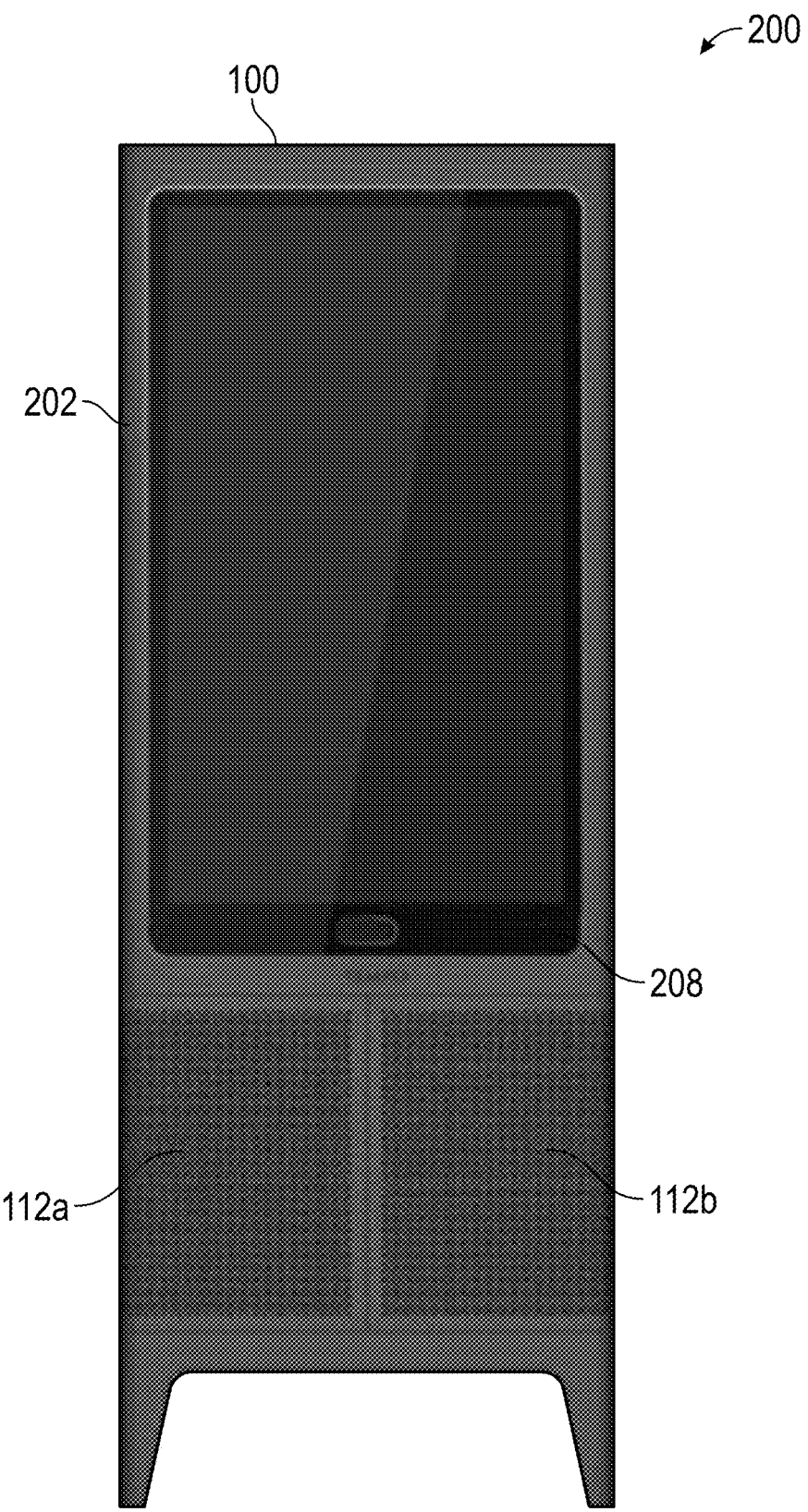
FIGS. 2A-2F are schematic diagrams depicting orthographic views of a free-standing A-frame exercise equipment cabinet.

More specifically, FIG. 2A is a schematic diagram depicting a front-view 200 of an exterior of a free-standing A-frame exercise equipment cabinet. As shown in FIG. 2A, the free-standing A-frame exercise equipment cabinet 200 comprises a housing 202, left door 112a, right door 112b, a logo 206, and a computer screen display cover glass 208. The housing 202 may comprise 3 mm thick sheet of powder coated aluminum with a matte finish. The doors 112 may comprise 1.5 mm perforated sheet of powder coated steel with a matte finish. The computer screen display cover glass 208 may comprise a tempered glass sheet of back-painted masked glass with a high gloss finish.

Figure 2B:
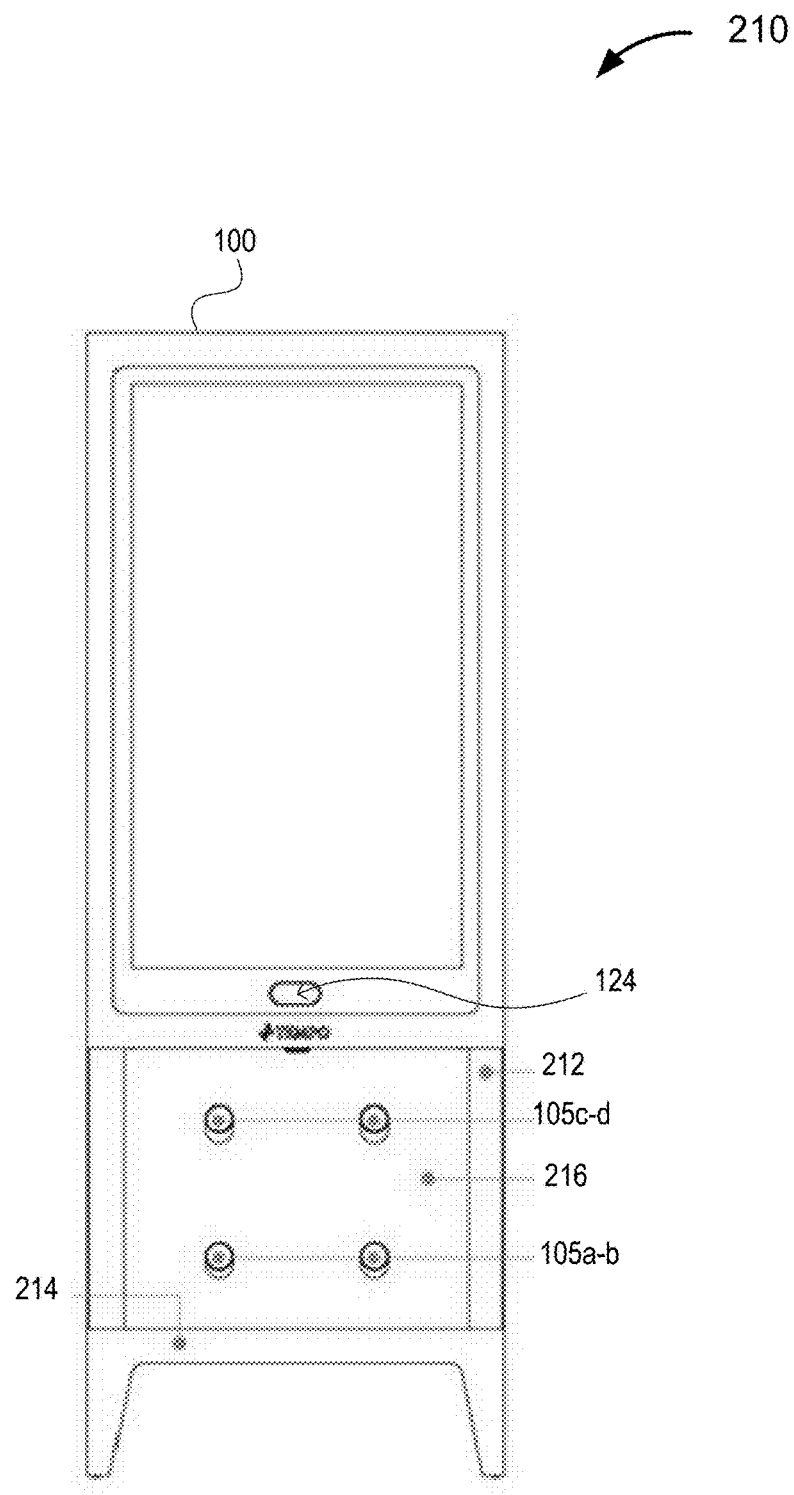

FIG. 2B is a schematic diagram depicting a front-view 210 of an interior of the free-standing A-frame exercise equipment cabinet 100. As shown, the front-view 210 includes mounts 105a-d, hinges 212, a tray 214 and an internal panel 216. The mounts 205 may comprise pegs of CeraKote aluminum tubing with a matte finish. The hinges 212 may comprise Blum hinges with a soft close and a matte finish. The tray 214 may be configured to store exercise equipment. The internal panel may comprise 3 mm thick sheet of powder coated aluminum with a matte finish.

Figure 2C:
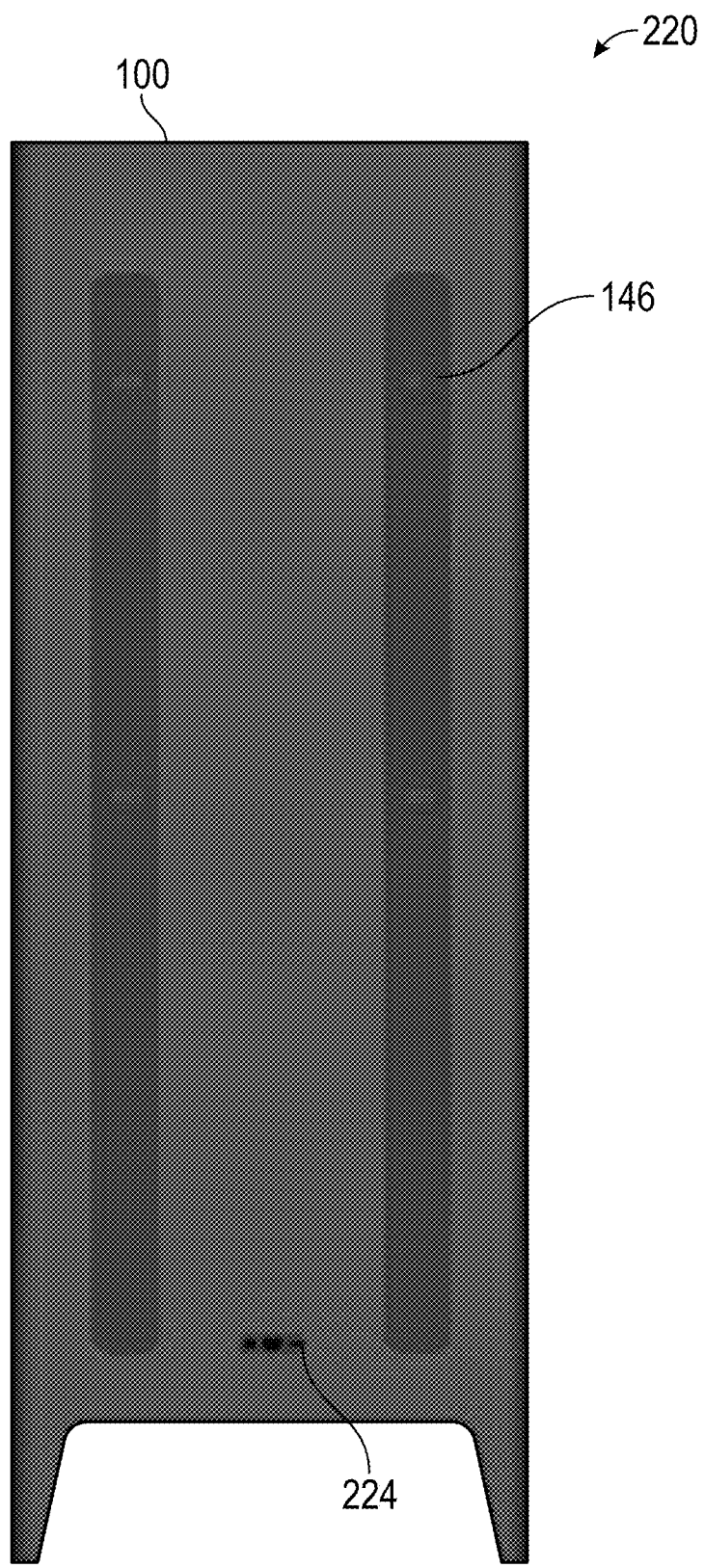

FIG. 2C is a schematic diagram depicting a rear-view 220 of the free-standing A-frame exercise equipment cabinet 100. As shown, the free-standing A-frame exercise equipment cabinet 100 can include barbell mounts 146, back rubber pads 222, and a port cover 224 (e.g., covering power connectors, network connectors, and/or the like).

Figures 2D, 2E:
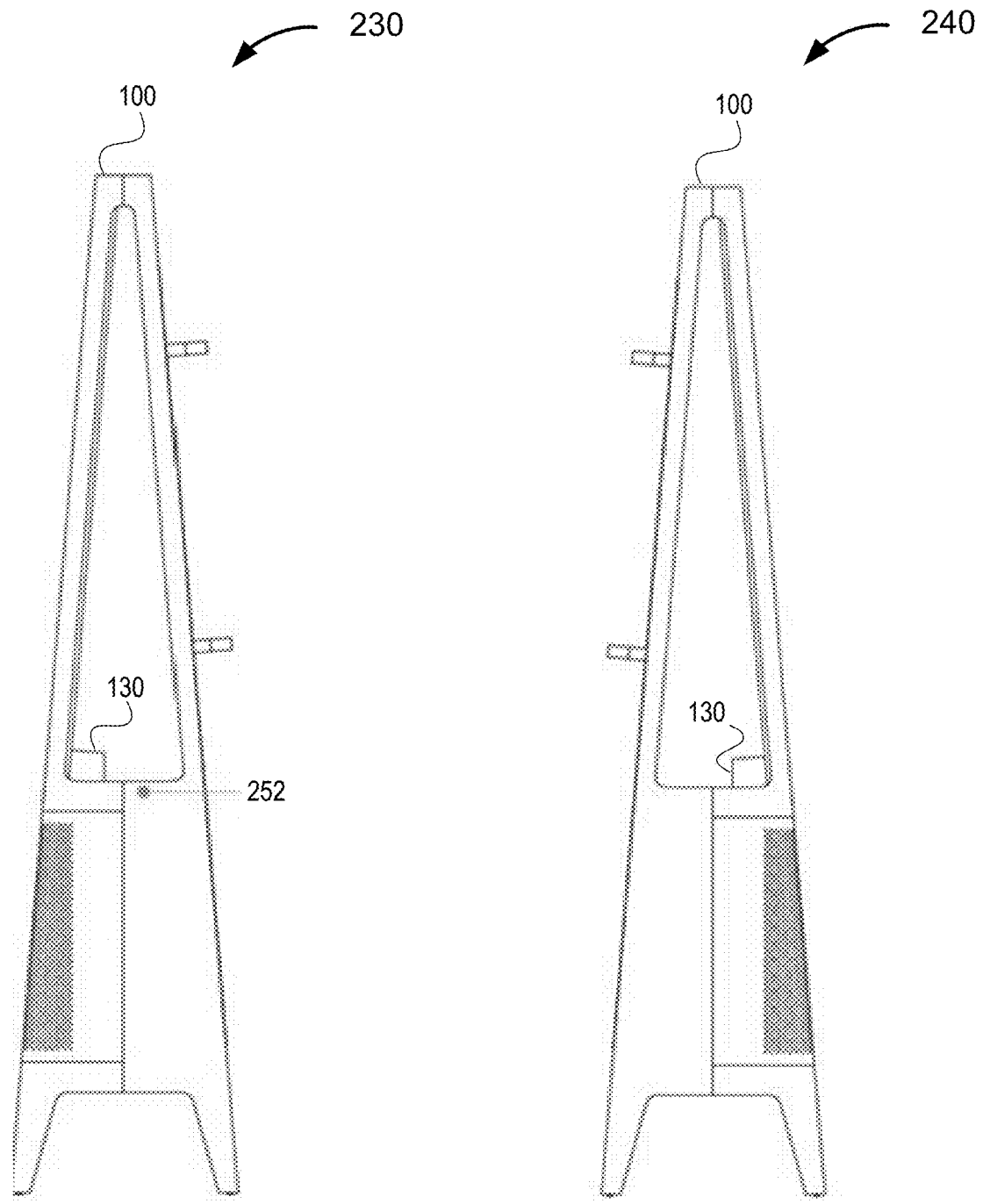
Figure 2F:
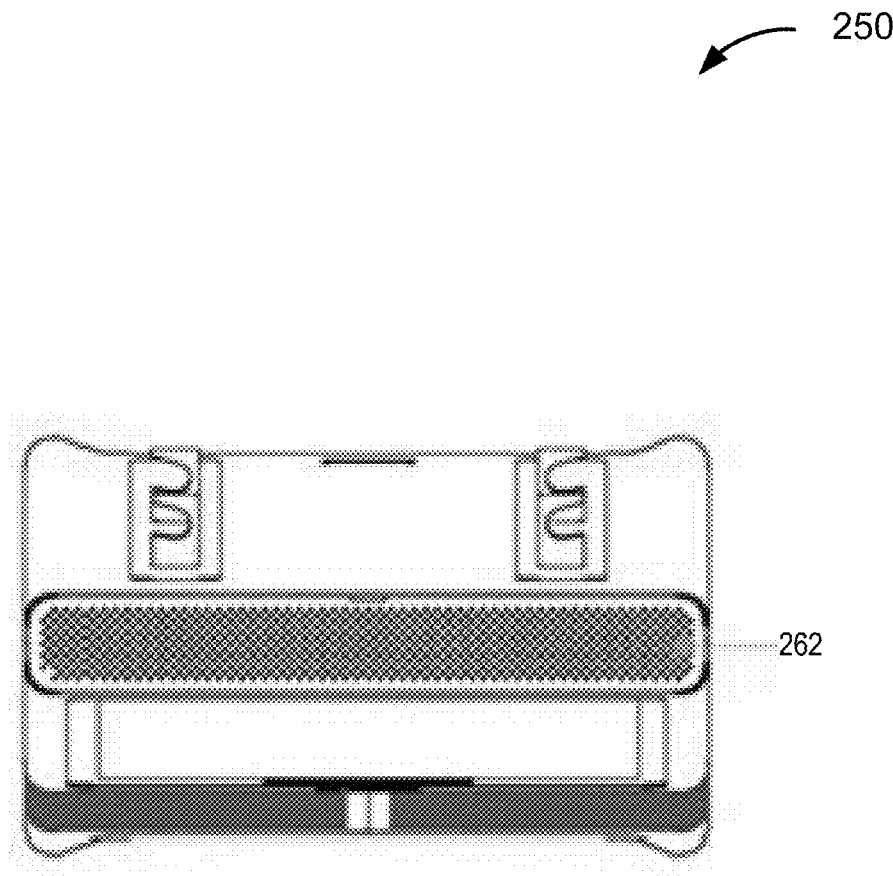

FIGS. 2D and 2E are schematic diagrams depicting side-views 230 and 240 of the free-standing A-frame exercise equipment cabinet 100. As shown, the free-standing A-frame exercise equipment cabinet 100 may include a middle rubber pad 252. FIG. 2F is a schematic diagram depicting an example view 250 of an audio speaker grill 262 of the free-standing A-frame exercise equipment cabinet 100. The audio speaker grill 262 may produce audio output (e.g., in conjunction with images presented on the computer screen display 122).

Figure 3:
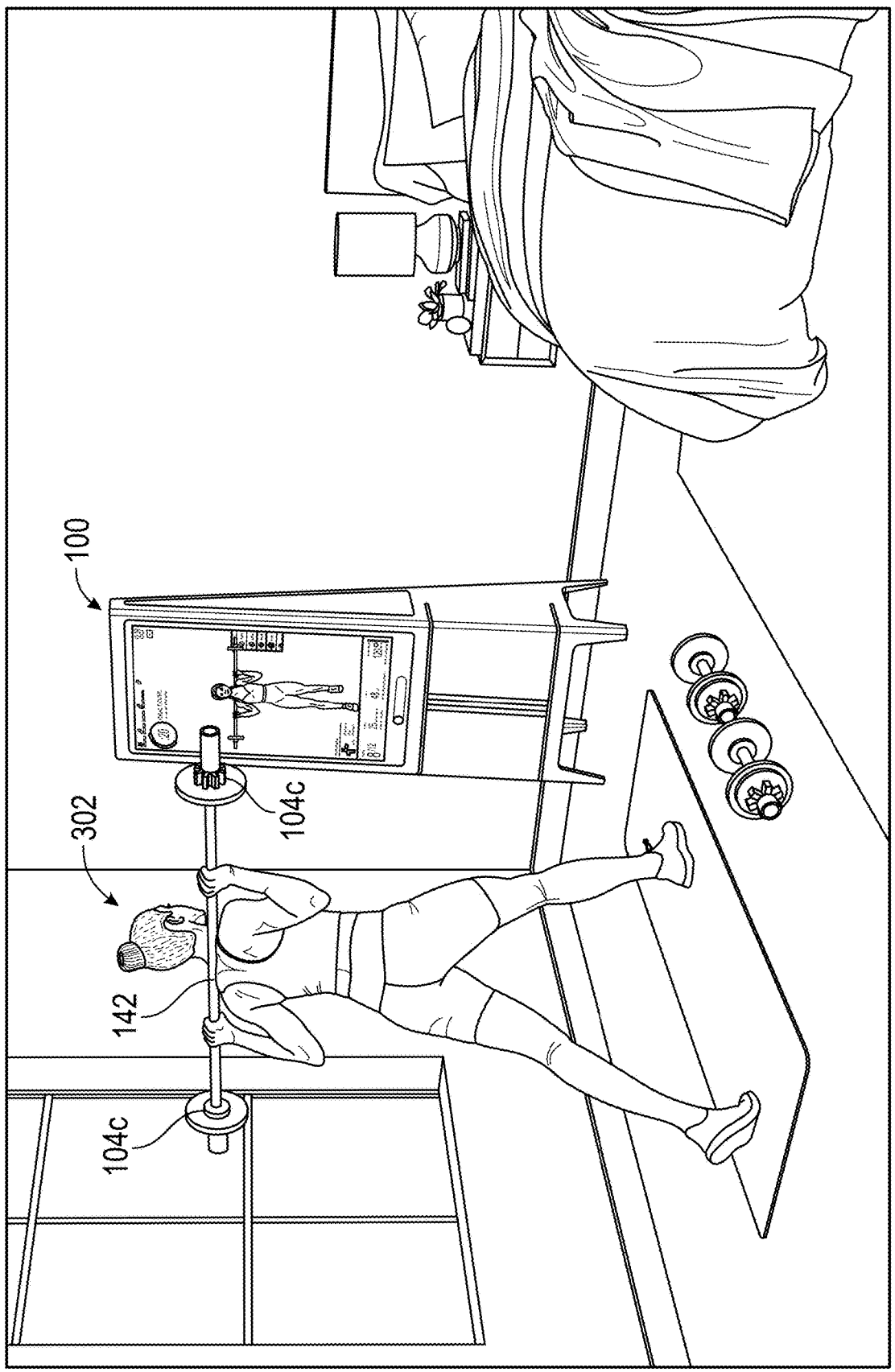
FIG. 3 depicts a user exercising using a free-standing A-frame exercise equipment cabinet.

FIG. 3 depicts a user 302 exercising using a free-standing A-frame exercise equipment cabinet 100. As shown, the user 302 is exercising using a barbell 142 and weight plates 104 from the free-standing A-frame exercise equipment cabinet 100, and the computer screen display 122 of free-standing A-frame exercise equipment cabinet 100 is presenting video of a trainer demonstrating proper form for the exercise movement.

Figure 4:
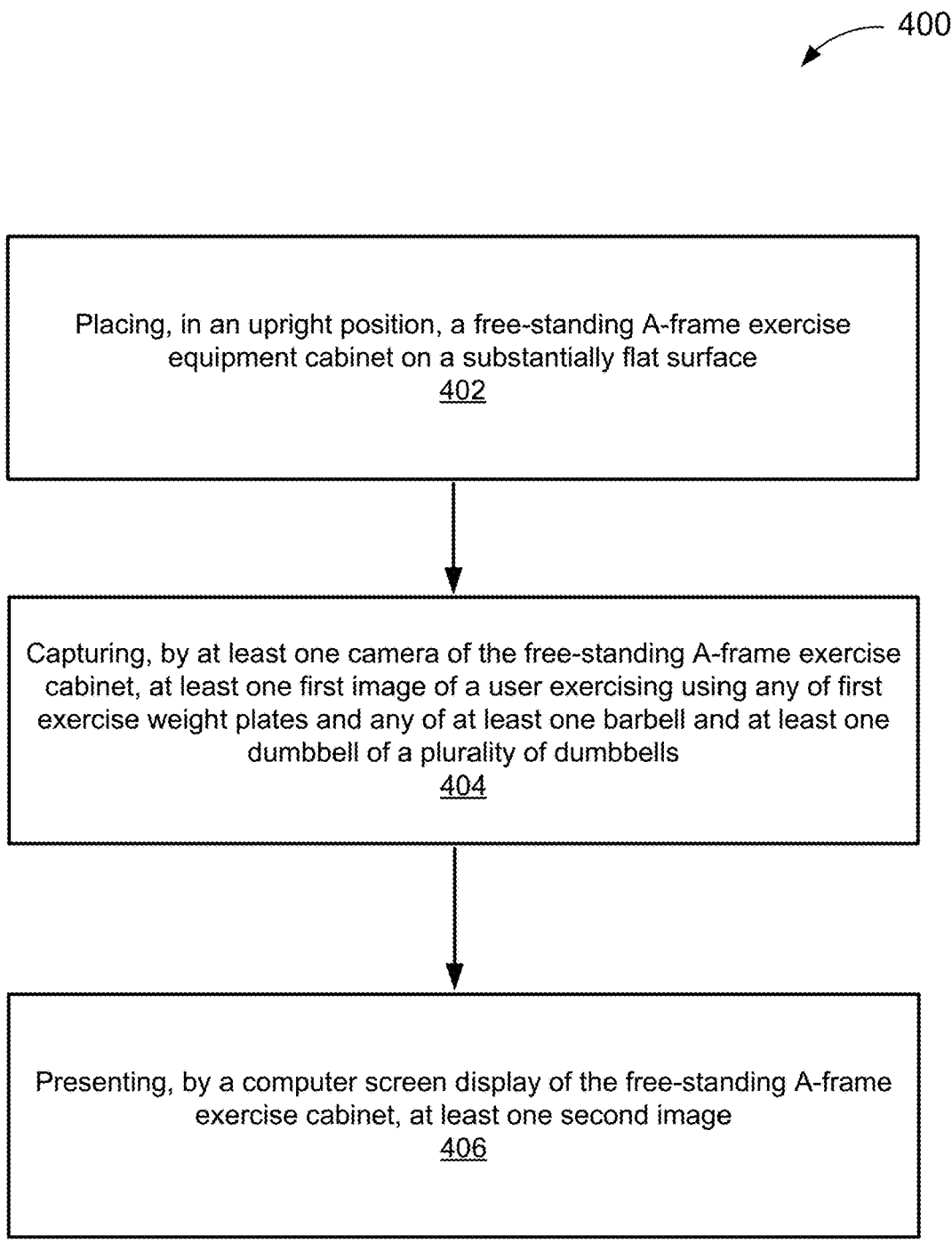
FIG. 4 is a flowchart of an example of a method of using a free-standing A-frame exercise equipment cabinet.

FIG. 4 is a flowchart 400 of an example of a method of using a free-standing A-frame exercise equipment cabinet (e.g., free-standing A-frame exercise equipment cabinet 100). In this and other flowcharts and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 402, a user places, in an upright position, the free-standing A-frame exercise equipment cabinet on a substantially flat surface, the free-standing A-frame exercise equipment cabinet (e.g., free-standing A-frame exercise equipment cabinet 100). For example, and as discussed elsewhere herein, the free-standing A-frame exercise equipment cabinet may include a first portion of the free-standing A-frame exercise equipment cabinet configured to removably house first exercise weight plates of a plurality of different sizes and a plurality of different weights; a second portion of the free-standing A-frame exercise equipment cabinet configured to house a computer screen display; a third portion of the free-standing A-frame exercise equipment cabinet configured to house at least one camera, one or more processors, and memory storing instructions that, when executed by the one or more processors, cause the free-standing A-frame exercise equipment cabinet to present a display on the computer screen display housed in the second portion of the free-standing A-frame exercise equipment cabinet; a fourth portion of the free-standing A-frame exercise equipment cabinet configured to removably house at least one barbell and a plurality of dumbbells; and a fifth portion of the free-standing A-frame exercise equipment cabinet comprising four legs of the free-standing A-frame exercise equipment cabinet, the four legs of the free-standing A-frame exercise equipment cabinet allowing the free-standing A-frame exercise equipment cabinet to stand upright without additional support.

In module 404, the free-standing A-frame exercise equipment cabinet captures, by the at least one camera, at least one first image of a user exercising using any of the first exercise weight plates and any of the at least one barbell and at least one dumbbell of the plurality of dumbbells.

In module 406, the free-standing A-frame exercise equipment cabinet presents, by the computer screen display, at least one second image. For example, the second image may include a rendered representation (e.g., based on a point cloud determined by the free-standing A-frame exercise equipment cabinet) of the user performing one or more exercise movements. In another example, the at least one second image may include a rendered image of an exercise instructor or a picture image or video image of an exercise instructor.

Cabinet Computer System

As noted elsewhere herein, the free-standing A-frame exercise equipment cabinet 100 described herein can include an integrated computer system. In some embodiments, the integrated computer system includes a computer-readable medium (CRM) and other computing components (e.g., as described elsewhere herein). A CRM can be a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g., "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end-users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

As discussed elsewhere herein, the free-standing exercise-equipment 100 that can include a computer screen display (e.g., mirror display) with touch screen interface. The free-standing A-frame exercise equipment cabinet 100 can, in some embodiments, also include a 3D motion capture system and advanced Artificial Intelligence that can use a live feedback system with ultra-low latency. A user interface working with the A.I. can provide technique feedback to help a user achieve proper form for an exercise movement (e.g., lunge, squat, and/or the like). The software system on the free-standing A-frame exercise equipment cabinet 100 can be able to detect a user's mistake in form (e.g., while performing a squat or other exercise movement) and inform the user when they have successfully corrected their error in performing the exercise.

In some embodiments, the hardware of the GPU and CPU are embedded locally in the free-standing A-frame exercise equipment cabinet 100 along with form models so that analysis and calculations on whether the proper form and technique are being used can be calculated in real time and then displayed back on the display screen to the user in real time while they are doing the exercise verses having to wait for all of that information being captured and then sent over the internet to a remote server for an internet site, which then could perform analysis and calculations on whether the proper form and technique are being used, and then send back the guidance. The lag between performing the exercise with an improper technique would not be quick enough for the user to correct their form via the feedback.

With built in 3D sensors of the free-standing A-frame exercise equipment cabinet 100, the free-standing A-frame exercise equipment cabinet 100 can track the user's form, count the user's exercise repetitions, and can recommend a heaviness of weights to use in an exercise. The computer vision system of the free-standing A-frame exercise equipment cabinet 100 can capture motion by emitting pulses of infrared light, for example, 30 times a second, generating a 3D model of the user's body made up of for example, 80,000 individual points. The Artificial Intelligence of the computer system of the free-standing A-frame exercise equipment cabinet 100 can analyze the, for example, 80,000 individual points and break this down into, for example, 25 points of the user's body's essential joints as the user works out.

The software in the integrated computer of the free-standing A-frame exercise equipment cabinet 100 can send relevant data on, for example, 25 joint movements and how that is relevant to the current exercise being performed by the user over the internet to a cloud platform for the free-standing A-frame exercise equipment cabinet 100 is much faster than 80,000 individual points 30 times a second over the internet to a cloud platform, which can significantly reduce lag in providing feedback from a live trainer or the software models when the user is still doing the exercise. Ultra-low latency can be achieved for the exercises being captured by the 3D video computer vision system of the free-standing A-frame exercise equipment cabinet 100, when the hardware and software performs the local calculations for an exercise being performed by the user to check for errors in that exercise.

As noted elsewhere herein, the hardware of the GPU and CPU are embedded locally in the free-standing A-frame exercise equipment cabinet 100 along with the form models so that the analysis and calculations on whether the proper form and technique are being used can be calculated in real time, thus, merely the results of the calculations and analysis need to be sent over the internet to the live trainer so the trainer can comment on the form and show proper technique in real time just like in a real time class. The local calculation and analysis allow for real-time form cues and feedback during the user's workout.

The live feedback system with ultra-low latency can use specialized hardware in the integrated computer system of the free-standing A-frame exercise equipment cabinet 100. The live feedback system with ultra-low latency allows for live video streaming from the studio to the users' screens. The computer vision captures motion by emitting pulses of infrared light, for example, 30 times a second, generating a 3D model of the user's body made up of for example, 80,000 individual points. The Artificial Intelligence can analyze the, for example, 80,000 individual points and break this down into, for example, 25 points of the user's body's essential joints as the user works out. The live feedback system with ultra-low latency can further compress down the information captured by the 3D camera hardware into information regarding what mistakes are made by user(s) and to what severity, number of repetitions, and/or the like.

As noted elsewhere herein the computer system may include 3D motion capture and Artificial Intelligence functionality. The 3D motion capture system and advanced Artificial Intelligence may use a computer vision software system for providing real-time guidance and measurement to users who are performing weight training and other exercises. In an example, a 3D time of flight camera and the computer vision software capture both RGB and motion capture of the user and their exercise equipment. The 3D motion capture system and advanced Artificial Intelligence track a user's form, count the user's repetitions, and can recommend weights while also empowering live coaches to give the user a richer and more effective workout.

In some embodiments, the free-standing A-frame exercise equipment cabinet 100 can be equipped with a 3D motion capture system and advanced Artificial Intelligence system that can empower live athletic coaches to give the user a richer and more effective workout. Accordingly, the free-standing A-frame exercise equipment cabinet 100 can be an all-in-one home fitness studio featuring elite trainers who can see when the user makes a mistake and help the user fix it, live. With its built in 3D sensors, the 3D motion capture system and advanced Artificial Intelligence can track the user's form, count the user's repetitions, and recommend weights. The computer vision software can use models to help track user's motion as well as track the color and geometry of weights on a barbell or dumbbell.

In some embodiments, the computer vision captures motion by emitting pulses of infrared light, for example, 30 times a second, generating a 3D model of the user's body made up of for example, 80,000 individual points. The Artificial Intelligence can analyze the, for example, 80,000 individual points and break this down into, for example, 25 points of the user's body's essential joints as the user works out. The live feedback system with ultra-low latency can further compress down the information captured by the 3D camera hardware into information regarding what mistakes are made by user(s) and to what severity, number of reps, etc. Powered by two or more 3D motion sensors and A.I., the 3D motion capture system and advanced Artificial Intelligence analyzes 25 points of the user's body's essential joints as the user works out and gives the user easily understood form feedback. The system takes in the information corresponding to at least this raw 3D model and pares it down to 25 essential joints, while also tracking the motion of the user's exercise equipment, such as barbell and dumbbells.

In an example, this step may require a GPU with at least 2 GB of RAM to be available onboard the device, which allows the local computing system in the cabinet to avoid uploading this data to the cloud. This has three major advantages:
Instantaneity—the system has a latency of <100 ms;
Security—no image data is required to be uploaded during use; and
Much lower internet bandwidth requirement—in a normal representation uploading the raw data would require bandwidth upwards of 30 MB/s, which is currently very rare and would limit the users who could use the home gym exercise platform to people in major cities with excellent internet infrastructure.

These positions may be recorded for each frame from the camera (e.g., at 30 frames-per-second).

Next, the software interprets the user's motion over a period of time, comparing it against models of good and bad technique. When the user makes an error in technique/form, the error is detected by running CNNs, statistical analysis, or support vector machines across the feature vector of the human skeleton across one or more frames, producing an error "severity" score on the interval (e.g., 0 to 1) that represents how badly the user made the mistake, with 1.0 being "as bad as possible".

In some embodiments, a trainer can view a user in his or her live class and see a user using bad form highlighted with their name in red. The analyzer module then decides if this severity score is above a threshold. This threshold is dynamic and specific to a user—a beginner will have a higher threshold than an expert. If the score is above the threshold, the user will be notified by an onscreen indicator that they have made this error. The user interface can indicate the error and also show the user the error in their exercise form.

Thus, the software can trigger a notification that tells the user what mistake they have made. A user interface can display, for example, with red text "bad depth" in red on the display screen on the free-standing A-frame exercise equipment cabinet 100 or some things like knees over toes would be the proper technique. Also, the user can also see their form in real time being displayed on the display screen on the free-standing exercise equipment cabinet 100. The live trainer when it is a live class, or a video when it is a recorded class, can present the proper technique to correct the error in the user's exercise form.

The computer vision system can use, for example, a built-in Azure Kinect 3D sensor. By making use of artificially intelligent intelligence and the Azure Kinect 3D sensor, the 3D vision system can track the user's every move, comparing what it is capturing against how each movement (e.g., lift) should look. The artificial intelligence knows exactly, for example, what dumbbell presses should look like for that individual, the correct form for push-ups, and even how a burpee should be performed. In other words, it is like having a digital personal trainer watching the user's every move and just slightly altering the user's form as needed. The computer vision with its 3D camera kinetic human motion tracking hardware can supply information into the A.I. and models to notice form errors in, for example, weight training exercises.

The live feedback system with ultra-low latency quickly delivers feedback triggered by the user(s) to the trainers which then allows for the live feedback from the trainer to the user(s). The Machine learning models/algorithms take the input of million points of raw data (in 3D depth and RGB) captured by two or more sensors to create at least the 25 points on the skeleton and then interprets what is a repetition, what is a right form for that user and that exercise, what is wrong and different levels of severity for what is wrong about the exercise being performed by the user.

An example set of machine learning models/algorithms and the artificial intelligence evaluation process can be as follows. The artificial intelligence is trained specifically for each exercise, feedback, or other feature. Some of the artificial intelligence models have been trained with supervised learning, some with unsupervised learning, some with both, and some are just calculations based on the skeletal data. Note, some classes of exercise have similar ML approaches and minorly tweaked configurations. For example, bicep exercises can all use similar models but depending on the type of bicep exercise (e.g., Dumbbell Bicep Curl, Barbell Bicep Curl, alternating versions of those, Barbell Reverse Curl and a few others) have minorly tweaked configurations.

In some embodiments, each set of training can evaluate form such as when users are dangerously using their back to lift the weight instead of their arms. In an example, a statistical model based on the positions of the 3D joints can estimates the orientation of the back, and tracks this through the rep, using the range of motion in space and comparing this to a simple supervised-learned ML model that calculates and reports a severity score (e.g., 0 to 1).

Thus, for example, when the user makes an error, the error is detected by, for example, by running convolutional neural networks CNNs, recurrent neural networks (RNN), statistical analysis, or support vector machines across the feature vector of the human skeleton across one or more frames, producing an error "severity" score on the interval (e.g., 0 to 1) that represents how badly the user made the mistake, with, for example, 1.0 being "as bad as possible".

An example analyzer module in integrated computer system of the free-standing A-frame exercise equipment cabinet 100 working with the artificial intelligence, then decides if this severity score is above a threshold. This threshold is dynamic and specific to a user—e.g., a beginner will have a higher threshold than an expert. If the score is above the threshold, the user will be notified by an onscreen indicator on the touch screen display on the free-standing equipment cabinet that they have made this error.

The trained models, classifiers and other artificial intelligence can use a feedback path to use unsupervised learning algorithms to update the model when it is deployed at someone's dwelling. The trained models, classifiers, and other artificial intelligence can be individualized for the users at that location and/or be based on average example users during the training. The trained models, classifiers, and other artificial intelligence can use many different weighting factors to generate the score, which has the dynamic threshold. The trained models, classifiers, and other artificial intelligence can be trained from three years of exercises by users in a gym setting captured by 3D equipment in a 3D motion capture studio into 3D data sets with over 1 million tagged recordings and analyzed.

In an example, the free-standing A-frame exercise equipment cabinet 100 includes a 3D time of flight camera that can have example minimum requirements for the CPU (e.g., cores, threads, processor speed, etc.) and GPU (e.g., memory size, memory speed, etc.) to allow for the live training and feedback. For example, hardware requirements can be:
GPU with >=3 GB of RAM;
CPU with >=4 cores, equivalent computing power to an Intel 9th-generation i5 processor.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made, and other embodiments may be used without departing from the broader scope of the present invention(s). Therefore, these and other variations upon the example embodiments are intended to be covered by the present invention(s).

What is claimed is:

1. A free-standing exercise equipment cabinet comprising:
a weight cabinet of the free-standing exercise equipment cabinet configured to removably include first exercise weight plates of a plurality of different sizes and a plurality of different weights;
a screen housing of the free-standing exercise equipment cabinet configured to include a computer screen display;
a computer component portion of the free-standing exercise equipment cabinet configured to include:
one or more processors;
memory storing instructions that, when executed by the one or more processors, cause the free-standing exercise equipment cabinet to present an image on the computer screen display;
a rear portion of the free-standing exercise equipment cabinet configured to removably house at least one two different types of weights;
a bottom portion of the free-standing exercise equipment cabinet allowing the free-standing exercise equipment cabinet to stand upright without additional support;
wherein the weight cabinet of the free-standing exercise equipment cabinet comprises two ventilated door panels configured to provide ventilation to the weight cabinet of the free-standing exercise equipment cabinet when the two ventilated door panels are in a closed position.

2. The free-standing exercise equipment cabinet of claim 1, wherein the two ventilated door panels are configured to provide access to the first exercise weight plates when the two ventilated door panels are in an open position.

3. The free-standing exercise equipment cabinet of claim 1, wherein the first exercise weight plates include barbell weight plates and dumbbell weight plates.

4. The free-standing exercise equipment cabinet of claim 1, wherein the computer screen display comprises a computer screen display having a diagonal length of at least 40".

5. The free-standing exercise equipment cabinet of claim 1, wherein the screen housing of the free-standing exercise equipment cabinet comprises a top front portion of the free-standing exercise equipment cabinet.

6. The free-standing exercise equipment cabinet of claim 5, wherein the weight cabinet of the free-standing exercise equipment cabinet is below the screen housing of the free-standing exercise equipment cabinet.

7. The free-standing exercise equipment cabinet of claim 1, wherein the rear portion of the free-standing exercise equipment cabinet includes a plurality of fixed mounts configured to a receive the different types of weights.

8. The free-standing exercise equipment cabinet of claim 1, wherein the weight cabinet of the free-standing exercise equipment cabinet includes a plurality of fixed mounts, each of the plurality of fixed mounts configured to receive any of a dumbbell weight plate and a barbell weight plate.

9. The free-standing exercise equipment cabinet of claim 1, further comprising a substantially flat panel coupled to the bottom portion of the free-standing exercise equipment cabinet, the substantially flat panel configured to removably house second exercise weight plates of a plurality of different sizes and a plurality of different weights.

10. The free-standing exercise equipment cabinet of claim 1, wherein the weight cabinet of the free-standing exercise equipment cabinet includes a plurality of hinges allowing two door panels to open in an outward direction and preventing the two door panels from opening in an inward direction.

11. The free-standing exercise equipment cabinet of claim 1, further comprising an open-air interior portion of the free-standing exercise equipment cabinet configured to removably store additional exercise equipment.

12. The free-standing exercise equipment cabinet of claim 11, wherein the additional exercise equipment includes a yoga mat.

13. The free-standing exercise equipment cabinet of claim 1, further comprising an open-air interior portion with an upper middle portion of the free-standing exercise equipment cabinet, the upper middle portion of the free-standing exercise equipment cabinet positioned between the screen housing of the free-standing exercise equipment cabinet and the rear portion of the free-standing exercise equipment cabinet.

14. The free-standing exercise equipment cabinet of claim 1, further comprising an open-air interior portion with two opposing openings, each of the two opposing openings providing access to an interior of the open-air interior portion.

15. The free-standing exercise equipment cabinet of claim 14, wherein the two opposing openings of the free-standing exercise equipment cabinet each comprise open-air openings that always remain open.

16. The free-standing exercise equipment cabinet of claim 1, further comprising an audio speaker portion configured to include one or more audio speakers.

17. The free-standing exercise equipment cabinet of claim 16, wherein the instructions further cause the free-standing exercise equipment cabinet to present audio through the one or more audio speakers.

18. A method of exercising using an exercise equipment cabinet, the method comprising:
    placing, in an upright position, the free-standing exercise equipment cabinet on a substantially flat surface, the free-standing exercise equipment cabinet comprising:
        a weight cabinet of the free-standing exercise equipment cabinet configured to removably house first exercise weight plates of a plurality of different sizes and a plurality of different weights;
        a second portion of the free-standing exercise equipment cabinet configured to house a computer screen display;
        a third portion of the free-standing exercise equipment cabinet configured to house:
            one or more processors;
            memory storing instructions that, when executed by the one or more processors, cause the free-standing exercise equipment cabinet to present a display on the computer screen display housed in the second portion of the free-standing exercise equipment cabinet;
        a fourth portion of the free-standing exercise equipment cabinet configured to removably house at least two different types of weights;
        a fifth portion of the free-standing exercise equipment cabinet comprising a bottom portion allowing the free-standing exercise equipment cabinet to stand upright without additional support;
    presenting, by the computer screen display, at least one first image;
    wherein the weight cabinet of the free-standing exercise equipment cabinet comprises two ventilated door panels configured to provide ventilation to the weight cabinet of the free-standing exercise equipment cabinet when the two ventilated door panels are in a closed position.

19. A system comprising:
    means for placing, in an upright position, the free-standing exercise equipment cabinet on a substantially flat surface, the free-standing exercise equipment cabinet comprising:
        a weight cabinet of the free-standing exercise equipment cabinet configured to removably house first exercise weight plates of a plurality of different sizes and a plurality of different weights;
        a second portion of the free-standing exercise equipment cabinet configured to house a computer screen display;
        a third portion of the free-standing exercise equipment cabinet configured to house:
            one or more processors;
            memory storing instructions that, when executed by the one or more processors, cause the free-standing exercise equipment cabinet to present a display on the computer screen display housed in the second portion of the free-standing exercise equipment cabinet;
        a fourth portion of the free-standing exercise equipment cabinet configured to removably house at least two different types of weights;
        a fifth portion of the free-standing exercise equipment cabinet comprising four legs of the free-standing exercise equipment cabinet, the four legs of the free-standing exercise equipment cabinet allowing the free-standing exercise equipment cabinet to stand upright without additional support;
    means for presenting, by the computer screen display, at least one first image;
    wherein the weight cabinet of the free-standing exercise equipment cabinet comprises two ventilated door panels configured to provide ventilation to the weight cabinet of the free-standing exercise equipment cabinet when the two ventilated door panels are in a closed position.

* * * * *